United States Patent
Fedorenko et al.

(10) Patent No.: US 12,271,361 B2
(45) Date of Patent: Apr. 8, 2025

(54) MULTI-TENANT PARTITIONED DATA STORE USING KEY/VALUE BUCKETS

(71) Applicant: salesforce.com, inc., San Francisco, CA (US)

(72) Inventors: Igor Fedorenko, Toronto (CA); Helen Kwong, Danville, CA (US); Benjamin Busjaeger, San Carlos, CA (US)

(73) Assignee: Salesforce, Inc., San Francisco, CA (US)

( * ) Notice: Subject to any disclaimer, the term of this patent is extended or adjusted under 35 U.S.C. 154(b) by 471 days.

(21) Appl. No.: 17/407,993

(22) Filed: Aug. 20, 2021

(65) Prior Publication Data

US 2023/0067776 A1    Mar. 2, 2023

(51) Int. Cl.
*G06F 16/22* (2019.01)

(52) U.S. Cl.
CPC ............................. *G06F 16/2255* (2019.01)

(58) Field of Classification Search
None
See application file for complete search history.

(56) References Cited

U.S. PATENT DOCUMENTS

| | | | | |
|---|---|---|---|---|
| 9,734,180 | B1* | 8/2017 | Graham | G06F 16/24542 |
| 10,042,876 | B2* | 8/2018 | Derby | G06F 16/2456 |
| 10,318,491 | B1* | 6/2019 | Graham | G06F 16/182 |
| 11,061,930 | B1* | 7/2021 | Golding | G06F 3/0611 |
| 2010/0030995 | A1* | 2/2010 | Wang | G06F 16/2282 |
| | | | | 711/E12.001 |
| 2011/0282864 | A1* | 11/2011 | Collins | G06F 16/24532 |
| | | | | 707/719 |
| 2019/0004863 | A1* | 1/2019 | Mainali | G06F 9/5083 |
| 2019/0392047 | A1* | 12/2019 | Sorenson, III | G06F 16/172 |
| 2020/0042538 | A1* | 2/2020 | Stewart | G06F 16/278 |

\* cited by examiner

*Primary Examiner* — Polina G Peach
*Assistant Examiner* — Anugeetha Kunjithapatham
(74) *Attorney, Agent, or Firm* — Kowert, Hood, Munyon, Rankin & Goetzel, P.C.; Michael B. Davis; Dean M. Munyon (57) ABSTRACT

Techniques are disclosed relating to multi-tenant database systems with underlying key/value storage. In some embodiments, a computing system generates first logical table information for a first portion of a multi-tenant dataset corresponding to a first tenant and second logical table information for a second portion of the dataset corresponding to a second tenant. The system may store the first and second logical tables using non-relational key/value data structures in one or more storage elements, including: storing entries from the first logical table across a first set of multiple key/value store buckets and storing entries from the second logical table across a second set of multiple key/value store buckets. Disclosed techniques may reduce performance issues due to hotspots while allowing efficient data access for a given tenant by limiting the number of buckets per tenant, relative to traditional techniques.

18 Claims, 7 Drawing Sheets

FIG. 9

MULTI-TENANT PARTITIONED DATA STORE USING KEY/VALUE BUCKETS

BACKGROUND

Technical Field

This disclosure relates generally to database systems and more particularly to multi-tenant database systems with underlying key/value storage.

Description of the Related Art

Database systems may store large data sets and handle complex requests to query, sort, or modify stored data. In multi-tenant contexts, database tables may be shared by multiple tenants while maintaining security of data such that a given tenant cannot access other tenants' data. As the number of tenants and the size of datasets increases, traditional relational databases may struggle to provide satisfactory performance.

Non-relational storage such as key/value stores may provide excellent scalability, speed, and flexibility, but may not be optimized for certain types of operations or complex queries.

DETAILED DESCRIPTION

The present disclosure describes various techniques for implementing a multi-tenant data store using underlying key/value storage. In some embodiments, a multi-tenant dataset (corresponding to an entity type) is logically divided into different logical tables for different tenants (where each of these logical tables is an instance of the entity type). Data from the logical tables are then spread across multiple non-relational (e.g., key/value store) buckets (with potential overlap in buckets used by different tables). The records within each bucket may be sortable such that they are queryable ordered by key (although "order by" queries may not be supported across different buckets).

Disclosed techniques may have various technical advantages in the context of database systems, particularly in the context of large data sets with substantial numbers of tenants and tables that may support various database operations. It may be challenging for computing systems to provide reliable storage for such large amounts of data while still providing good performance for various types of accesses. For example, one implementation of a multi-tenant datastore using key/value storage might place tenant data in their own portions of a key/value storage. Certain tenants or data blocks are typically accessed much more frequently than others, however, so such an implementation might create hotspots in the storage and bottleneck transactions, reducing performance. Another implementation of a multi-tenant datastore using key/value store partitions might distribute the entire dataset across a number of key/value partitions. This may be inefficient, e.g., by requiring scanning of a large number of partitions when accessing data for one tenant. As the number of tenants grows, the potential drawbacks to these implementations may further increase. Disclosed techniques discussed in detail below provide a hybrid technique, with data for a given tenant being distributed across a limited number of key/value store buckets.

Figure 1:
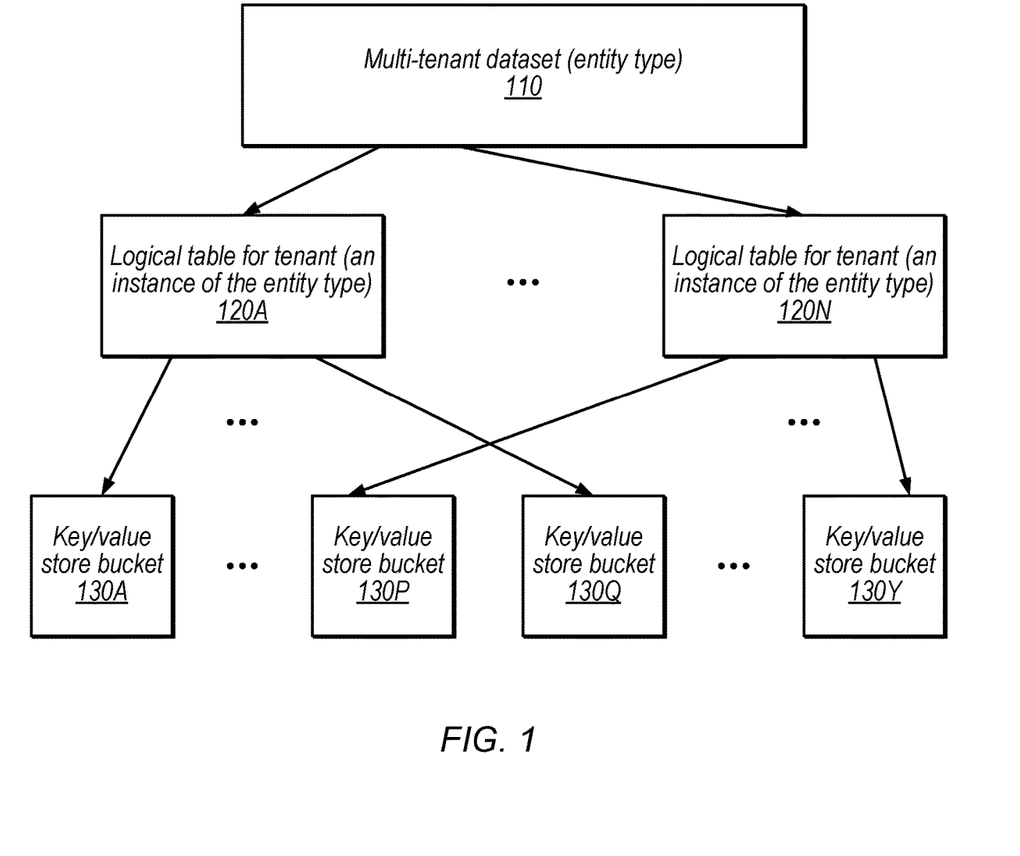
FIG. 1 is a diagram illustrating organization of a multi-tenant data set using key/value store buckets, according to some embodiments.

FIG. 1 is a block diagram illustrating example distribution of tenant data across key/value store buckets, according to some embodiments. In the illustrated embodiment, a multi-tenant dataset 110 is logically divided into multiple logical tables 120A-120N for different tenants. Each logical table is then distributed among a number of key/value store buckets. In some embodiments, the number of key/value store buckets is the same for each logical table of the multi-tenant dataset. In other embodiments, the number of buckets per logical table may vary for a given dataset. As shown, the key/value store buckets used for different logical tables may at least partially overlap. While records within a bucket must be ordered, in various embodiments, different key/value store implementations may or may not physically segregate or co-locate data in different buckets.

Note that the multi-tenant data set may be referred to as an entity type, which may correspond to a physical database table with properties of various types. For example, the entity type may be for an "account" and this entity type may be used by various tenants (e.g., different companies). Each company may customize the entity type, e.g., by adding attributes or columns, and the logical tables may correspond to instances of the entity type. An entity type instance for a particular tenant may be referred to as a tenant type. For example, a particular company's "account" logical table may be referred to as a tenant type. Further, in some embodiments there may be hierarchical organization of tenants, e.g., with top-level tenants corresponding to different clouds and lower-level tenants corresponding to different entities within the different clouds, as discussed in U.S. patent application Ser. No 16/588,550, filed Sep. 30, 2019 and titled "Nested Tenancy that Permits a Hierarchy having a Plurality of Nested Levels."

Examples of non-relational key/value store implementations that may be utilized by disclosed embodiments, include, without limitation: Redis, DynamoDB, memcached, NoSQLz, Hibari, Apache Ignite, etc. In some embodiments, buckets are identified using partition key suffixes. For example, a given logical table may be spread over a fixed number of partition keys, where each partition key includes a logical table identifier and a bucket identifier.

The topology of FIG. 1 may provide various advantages over other multi-tenant implementations of underlying key/value storage. For example, the disclosed typology may avoid bottlenecks by distributing tenant data (with different database compute nodes handling different sets of buckets) while limiting the number of buckets associated with each tenant to provide efficient data access.

Figure 2:
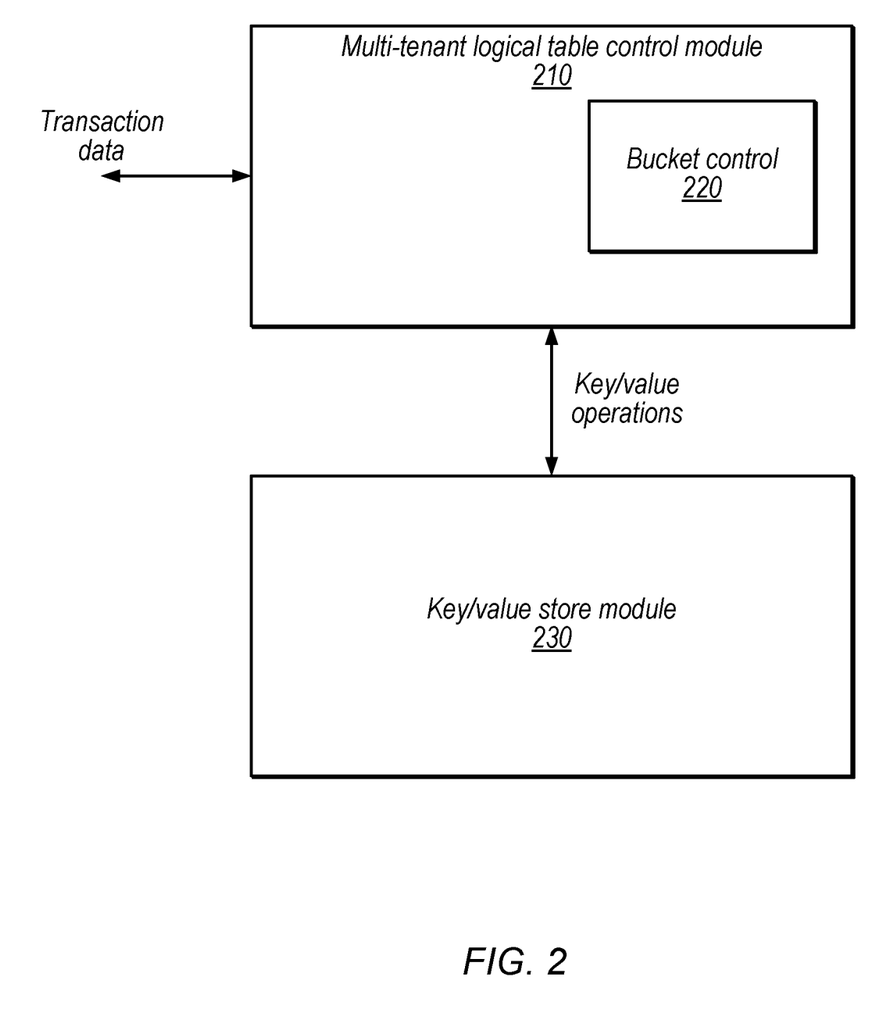
FIG. 2 is a block diagram illustrating an example multi-tenant logical table control module, according to some embodiments.

FIG. 2 is a block diagram illustrating an example multi-tenant logical table control module, according to some embodiments. In the illustrated embodiment, module 210 communicates transaction data with various requesters (e.g., computer systems of different tenants) for a multi-tenant data set that includes one or more entity types. In the illustrated embodiment, module 210 communicates with key/value store module 230 using key/value operations (e.g., providing a key and one or more attributes for write operations and a key for read operations to retrieve one or more attributes) to access data for the multi-tenant data set. Module 210 includes bucket control 220 which determines the appropriate buckets for accesses to the key/value store module. Thus, transactions for a given logical table may be restricted to that table's buckets and avoid searching the entirety of the buckets of module 230.

Figure 3:
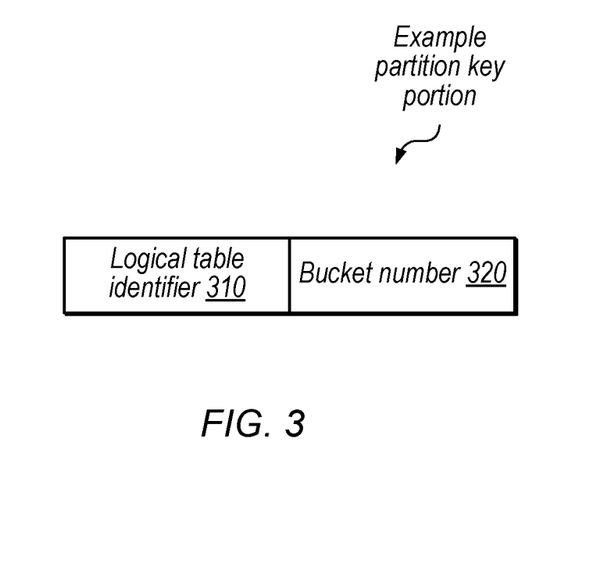
FIG. 3 is a diagram illustrating an example portion of a partition key, according to some embodiments.

FIG. 3 is a diagram illustrating an example partition key portion, according to some embodiments. In the illustrated example, the partition key includes a logical table identifier 310 and a bucket number 320. As discussed above, a number of partition keys may be generated for a given tenant and used to locate the buckets assigned to that tenant. The partition keys may be used to distribute data across partitions (examples of buckets), potentially in an even fashion. In some embodiments, the bucket number is generated using a hash function. The bucket number may be calculated based on a hash of the primary key of a given data element. The hash function may be a stable hash function under which, when a table is resized, only K/n keys are remapped on average (where K is the number of keys and n is the number of slots). Thus, the set of partitions for a given tenant may be readily identified by generating a set of partition keys.

In various embodiments, the illustrated fields may be part of a partition key suffix and the partition key may include various preceding fields. For example, various keys may be prefixed with an environment ID, higher-level tenant ID, etc. to differentiate between different data scopes.

In some embodiments, tables use hash-based partitioning to partition tenants that use shared tables, e.g., where has_key=tenantID+hash(tenantHashKey) % num_logical_partitions and range_key=tenantHashKey+tenantRangeKey. Similarly, the system may use hash-based partitioning to partition virtual tables: hash_key=vtable_id+hash(vtable_hash_key) % num_logical_partitions and range_key=vtable_hash_key+vtable_range_key.

Figure 4:
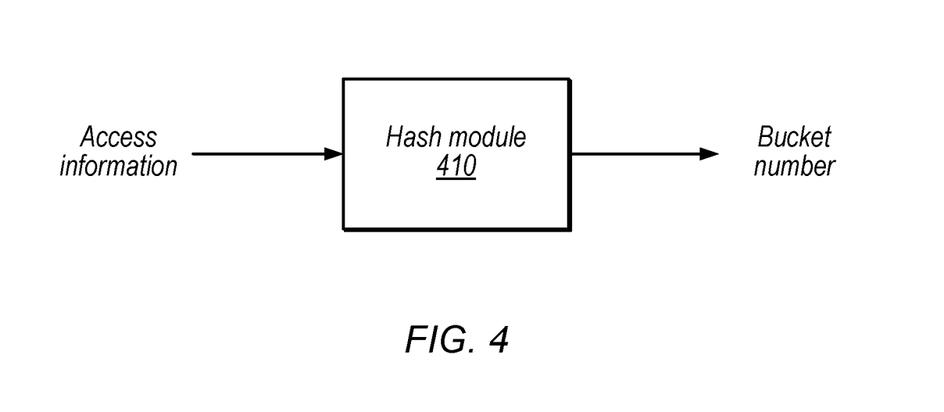
FIG. 4 is a block diagram illustrating an example hash module, according to some embodiments.
Figure 5:
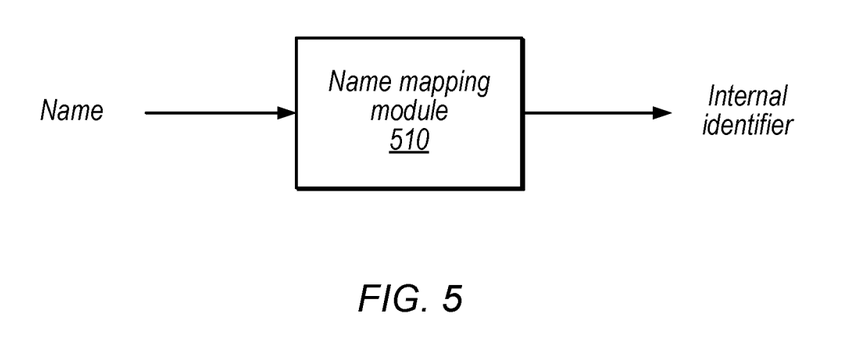
FIG. 5 is a block diagram illustrating an example name mapping module, according to some embodiments.
Figure 6:
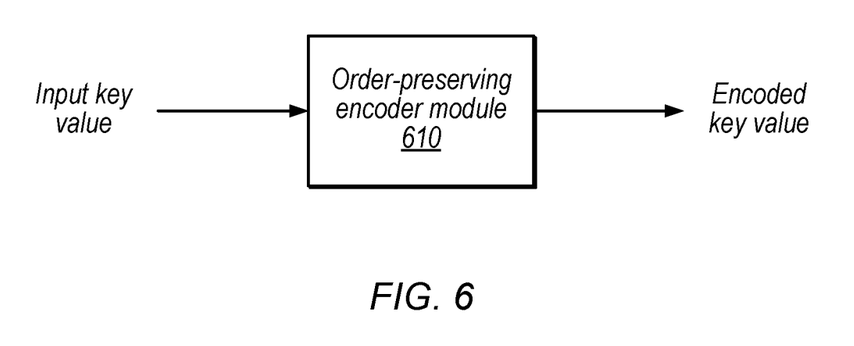
FIG. 6 is a block diagram illustrating an example order preserving encoder module, according to some embodiments.

FIG. 4 is a diagram illustrating an example hash module, according to some embodiments. Module 410 may be implemented by bucket control 220, for example. In the illustrated embodiment, the hash module operates on access information (e.g., the primary key) for a given access to generate a bucket number.

In some embodiments, the disclosed modules may operable to access data in a way that appears relational to client entities but uses underlying non-relational storage. In these embodiments, clients may use traditional database commands and may have their data migrated to new underlying storage without needing to change their access techniques.

In this disclosure, various "modules" operable to perform designated functions are shown in the figures and described in detail. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa."

Naming Mapping for Physical Item Attribute Names

In some embodiments, a database system implements an attribute and index naming scheme that is based on based on persistent numeric identifiers. In various embodiments, this may reduce the overall size of data by using smaller keys and may allow for data consistency in certain situations where an underlying data store does not guarantee immediate consistency (but may provide eventual consistency). Disclosed techniques may be particularly advantageous in a hierarchical tenancy model and may generate a large number of unique short names without using cross-tenant locks or other synchronization mechanisms at runtime.

In some embodiments, the following non-key attribute naming schema is implemented. Each logical property is be assigned a smallest available numeric identifier, unique within a scope and type hierarchy. In some embodiments, a scope:identifier tuple is used to enforce this uniqueness and allows identifier assignment in each scope independently from other scopes. Assigned identifiers cannot be reused, even if their corresponding property is removed. This may guarantee a "different property different attribute" invariant. This may result in longer attribute names for "high churn" type hierarchies, which may not be common, however.

Speaking generally, the disclosed naming scheme may be applied to properties of nested complex types and contained collections, if complex types and contained collections are not flattened onto the container. As an example of flattened/not-flattened implementations, in the following the "address" is a complex type property implementation that is not flattened:

```
{
  "name": "The Maids' Cottage"
  "address": {
    "street": "223 Main St",
    "city": "New Market",
  }
}
```

While in the following the same type has been flattened:

```
{
  "name": "The Maids' Cottage",
  "address_street": "223 Main St",
  "ddress_city": "New Market",
}
```

For example, in some embodiments, each ComplexType property is mapped to a single M (Map) attribute, which is named using the same naming scheme as simple-typed attributes. ComplexType properties may mapped to M attribute names using a non-key attribute naming schema applied to the ComplexType. That is, each complex type property may have a unique numeric identifier assigned to it, and the numeric identifier may be mapped to a short synthetic attribute name.

In some embodiments, each contained navigation property is mapped to a single M (Map) attribute, which may be named using the same naming scheme as simple-typed attributes. Map keys are string-encoded contained child entity key. Map values are encoded child entity non-key properties. Each child entity non-key property maybe encoded as M (Map) attributes. Map key are synthetic short names, based on unique numeric identifiers assigned to the child type properties In some embodiments, logical property names defined by top-level tenants in a hierarchy receive short names that start from letters A to P and short index names that start from numbers 2 to 5. Nested tenants receive short property and index names that start from letters a to p and numbers 6-9 respectively. Because the names start from disjoint sets of numbers, disclosed techniques that cannot collide, disclosed techniques may avoid. In some embodiments, each numeric identifier is a major:minor tuple, where the "major" part belongs to very small set of supported values (the two values 0 and 1 are used in the example below), and the "minor" part is a nonnegative integer (smaller values will typically map into shorter names).

The following tables summarize specific identifier to name mapping

| major = 0 non-key properties | attribute name |
|---|---|
| minor 0-15 | 'A'-'P' |
| minor 16+ | 'A' +, attr number in second + char |

| major = 1 non-key properties | attribute name |
|---|---|
| minor 0-15 | 'a'-'p' |
| minor 16+ | 'a' +, attr number in second + char |

| secondary index | key attribute name |
|---|---|
| major = 0 minor = 0 | '2' hash, '3' sort |
| major = 0 minor = 1 | '4' hash, '5' sort |
| major = 0 minor = 2+ | '2' + hash, '3' + sort multi-char |
| major = 1 minor = 0 | '6' hash, '7' sort |
| major = 1 minor = 1 | '8' hash, '9' sort |
| major = 1 minor = 2+ | '6' + hash, '7' + sort multi-char |

For example, a non-key attribute with (0:42) identifier will get name 'Aa', where the second char ('a') is a base62-encoded value that corresponds to minor=42.

Example Order Preserving Encoding for Key Values

In some embodiments, the database system is configured to receive keys used for the multi-tenant data set and map them to potentially-shorter keys for underlying key/value storage. In some embodiments, the key name mapping preserves ordering among keys for a given bucket. Therefore, disclosed mapping techniques may advantageously reduce storage requirements while maintaining sorting capabilities. The following example provides an order-preserving variable-length encoding for 64-bit signed integers, but other techniques may be used to preserve ordering for various types of mappings.

In the following example, values after encoding may range from one to nine bytes. In this example, the N (e.g., N=4) most significant bits of the first encoded byte encode the value class (see below), the rest are data bits.

A 1-byte encoded value has 4 data bits and can encode $2^4$=16 distinct values. A 2-byte encoded value has 12 data bits (4 in the first byte plus 8 in the second) and can encode $2^{12}$=4096 distinct values. And so on. Note that 9-byte encoded value has 68 data bits, which is more than needed by 64-bit [Long] input values. In some embodiments, the four most significant bits of the first encoded byte encodes the value class.

In some embodiments, class 0x0 is used to encode value "null." The only allowed encoded value in this class is 0x00 byte. Note that this is the lexicographically smallest possible encoded value, so "null" comes before non-null values when sorting.

In some embodiments, classes 0x8 to 0xF are used to encode non-negative values. Values are split into 8 non-overlapping ranges, and ranges with larger values are assigned to higher classes, which may guarantee correct lexicographical sort order of the encoded values.

In some embodiments, classes 0x7 to 0x1 are used to encode negative values. Values are split into seven non-overlapping ranges, and ranges with smaller values are assigned to lower classes to guarantee correct lexicographical sort order of the encoded values. Encoded values use two's complement representation (again, to get proper lexicographical sort order). In these examples, 9-byte encoded values have four unused data bits.

| Class | Length (bytes) | Data (bits) | Value range |
|---|---|---|---|
| 0 × 0 | 1 | 0 | null |
| 0 × 1 | 9 | 64 | Long.MIN_VALUE to −17661175009297 |
| 0 × 2 | 6 | 42 | −17661175009296 to −68988964881 |
| 0 × 3 | 5 | 36 | −68988964880 to − 269488145 |
| 0 × 4 | 4 | 28 | −269488144 to − 1052689 |
| 0 × 5 | 3 | 20 | −1052688 to −4113 |
| 0 × 6 | 2 | 12 | −4112 to −17 |
| 0 × 7 | 1 | 4 | −16 to −1 |
| 0 × 8 | 1 | 4 | 0 to 15 |
| 0 × 9 | 2 | 12 | 16 to 4111 |
| 0 × A | 3 | 20 | 4112 to 1052687 |
| 0 × B | 4 | 28 | 1052688 to 269488143 |
| 0 × C | 5 | 36 | 269488144 to 68988964879 |
| 0 × D | 6 | 42 | 68988964880 to 17661175009295 |
| 0 × E | 7 | 50 | 17661175009296 to 4521260802379791 |
| 0 × F | 9 | 64 | 4521260802379792 to Long.MAX_VALUE |

Thus, speaking generally, disclosed mapping techniques preserve ordering using a variable-length encoding in which a subset of bits (e.g., the first N bits) encode a class, which indicates the length of the encoded output (e.g., in bytes) and the potential range of values. The remaining bits encode a value within the potential range of values. These techniques may advantageously reduce the key size (and thus reduce overall database storage requirements) while preserving ordering among buckets.

Example Method

Figure 7:
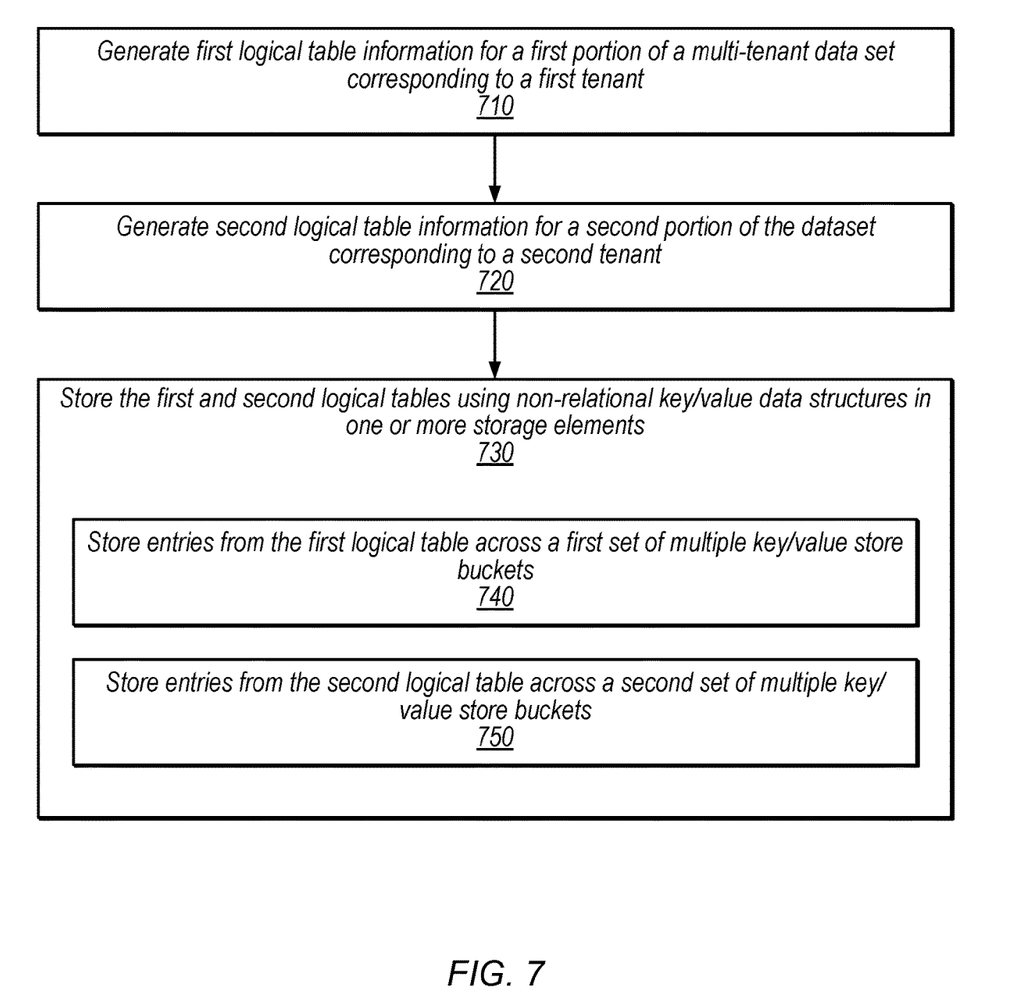
FIG. 7 is a flow diagram illustrating an example method, according to some embodiments.

FIG. 7 is a flow diagram illustrating a method for distributing tenant data among key/value buckets, according to some embodiments. The method shown in FIG. 10 may be used in conjunction with any of the computer circuitry, systems, devices, elements, or components disclosed herein, among other. In various embodiments, some of the method elements shown may be performed concurrently, in a different order than shown, or may be omitted. Additional method elements may also be performed as desired.

At 710, in the illustrated embodiment, the system generates first logical table information for a first portion of a multi-tenant data set corresponding to a first tenant.

At 720, in the illustrated embodiment, the system generates second logical table information for a second portion of the dataset corresponding to a second tenant.

At 730, in the illustrated embodiment, the system stores the first and second logical tables using non-relational key/value data structures in one or more storage elements. In the illustrated embodiment, this includes elements 740 and 750.

At 740, in the illustrated embodiment, the system stores entries from the first logical table across a first set of multiple key/value store buckets.

At 750, in the illustrated embodiment, the system stores entries from the second logical table across a second set of multiple key/value store buckets. In some embodiments, the first and second sets of multiple key/value store buckets at least partially overlap. In some embodiments, entries in respective key/value store buckets are sortable. In some embodiments, the storing uses partition keys to spread entries from the first and second logical tables across multiple key/value store buckets. In some embodiments, the partition keys include a logical table identifier and a bucket number, e.g., in a partition key suffix. In some embodiments, the bucket numbers are generated using a stable hash function.

In some embodiments, the system generates internal identifiers for key/value storage for names associated with the first and second logical tables according to a mapping technique, where a given internal identifier uses a smaller number of bits than its corresponding name. The names may be table names, column names, etc. In some embodiments, the mapping technique provides consistency such that a first name value used during a first time interval and re-used during a second time interval is mapped to two different internal identifiers during the different time intervals.

Exemplary Multi-Tenant Database System

Figure 8:
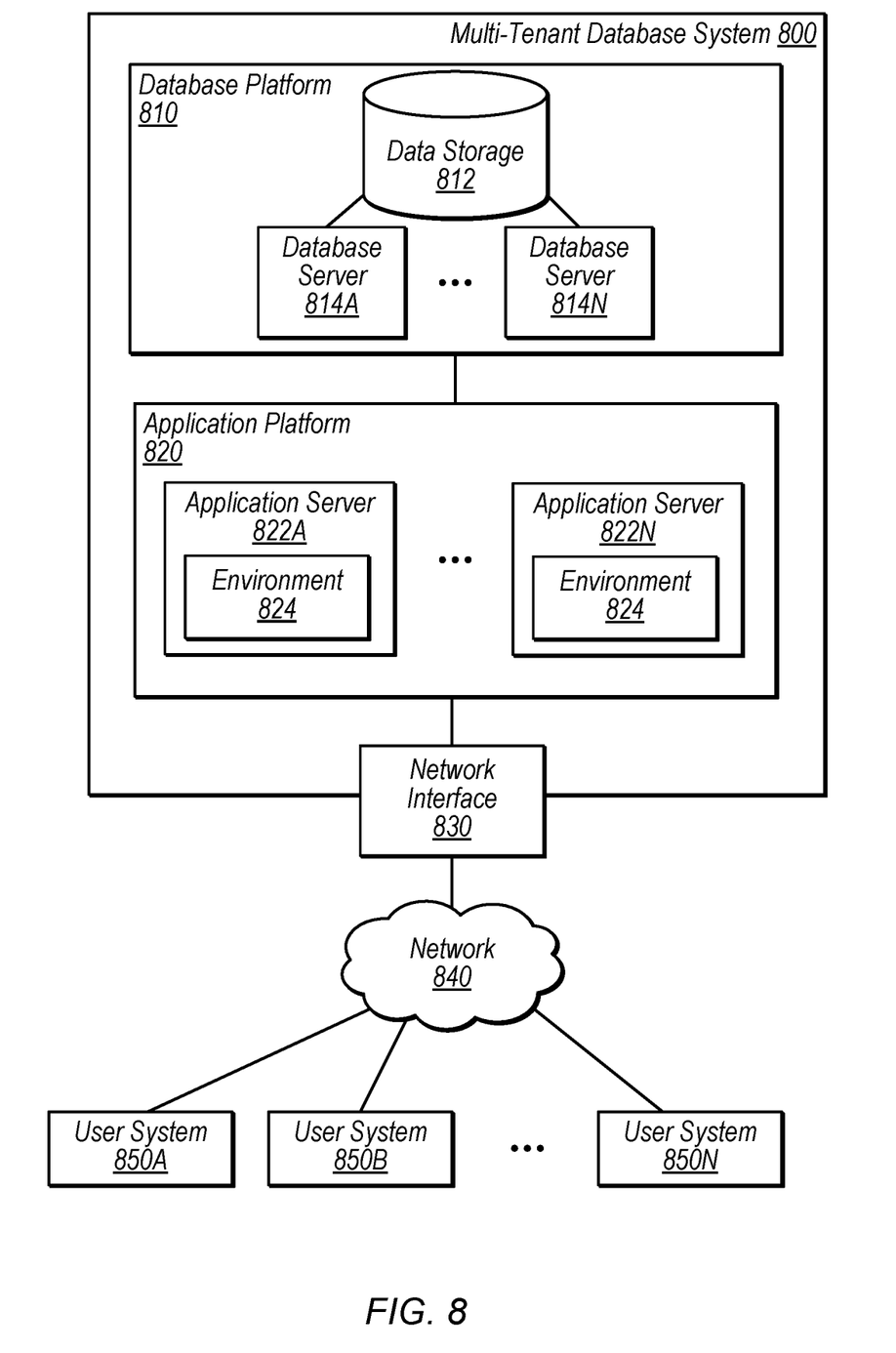
FIG. 8 is a block diagram illustrating an example multi-tenant system, according to some embodiments.

Turning now to FIG. 8, an exemplary multi-tenant database system (MTS) 800 in which various techniques of the present disclosure can be implemented is shown. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 812 is organized as part of a log-structured merge-tree (LSM tree). An LSM tree normally includes two high-level components: an in-memory buffer and a persistent storage. In operation, a database server 814 may initially write database records into a local in-memory buffer before later flushing those records to the persistent storage (e.g., data storage 812). As part of flushing database records, the database server 814 may write the database records into new files that are included in a "top" level of the LSM tree. Over time, the database records may be rewritten by database servers 814 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 812.

When a database server 814 wishes to access a database record for a particular key, the database server 814 may traverse the different levels of the LSM tree for files that potentially include a database record for that particular key. If the database server 814 determines that a file may include a relevant database record, the database server 814 may fetch the file from data storage 812 into a memory of the database server 814. The database server 814 may then check the fetched file for a database record having the particular key. In various embodiments, database records are immutable once written to data storage 812. Accordingly, if the database server 814 wishes to modify the value of a row of a table (which may be identified from the accessed database record), the database server 814 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 814, in various embodiments, are hardware elements, software routines, or a combination thereof capable of providing database services, such as data storage, data retrieval, and/or data manipulation. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree—database servers 814 maintain the LSM tree implemented on database platform 810. In some embodiments, database servers 814 implement a relational database management system (RDMS) or object oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 824 using an object notation that describes an object relationship mapping (e.g., a JavaScript object notation mapping) of the specified plurality of objects.

Exemplary Computer System

Figure 9:
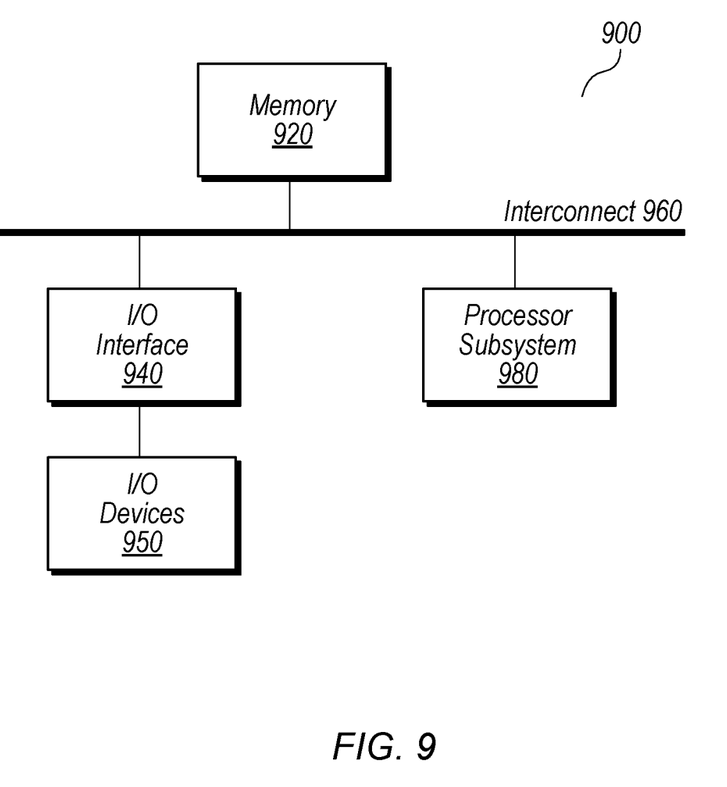
FIG. 9 is a block diagram illustrating elements of a computer system for implementing various systems described in the present disclosure, according to some embodiments.

Turning now to FIG. 9, a block diagram of an exemplary computer system 900, which may implement multi-tenant logical table control module 210, MTS 800, and/or user system 850, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement multi-tenant logical table control module 210 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3)

both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
    accessing, by a computing system, a multi-tenant dataset that includes a relational database table in which multiple tenants share one or more columns and a first tenant implements at least one added custom column;
    processing, by the computing system, the multi-tenant dataset to migrate the relational database table to non-relational underlying storage and divide the database table, including:
        generating first logical table information that specifies a first logical table for a first portion of the dataset corresponding to the first tenant including the at least one added custom column;
        generating second logical table information that specifies a second logical table for a second portion of the dataset corresponding to a second tenant; and
        storing the first and second logical tables using non-relational key/value data structures in one or more storage elements, including:
            storing entries from the first logical table for the first tenant across a first set of multiple key/value store buckets;
            storing entries from the second logical table for the second tenant across a second set of multiple key/value store buckets; and
            generating internal identifiers for key/value storage for names associated with the first and second logical tables according to a mapping function, wherein:
                a given internal identifier uses a smaller number of bits than its corresponding name, thereby reducing storage size relative to utilizing the names for key/value storage; and
                the mapping function preserves ordering among keys for a given bucket; and
    retrieving, by the computing system, values from the first set of multiple key/value store buckets based on a query from the first tenant that specifies one or more keys.

2. The method of claim 1, wherein entries in respective key/value store buckets are sortable.

3. The method of claim 1, wherein the first and second sets of multiple key/value store buckets at least partially overlap.

4. The method of claim 1, wherein the storing uses partition keys to spread entries from the first and second logical tables across multiple key/value store buckets.

5. The method of claim 4, wherein the partition keys include a logical table identifier and a bucket number.

6. The method of claim 5, further comprising generating bucket numbers using a stable hash function.

7. The method of claim 1, wherein the mapping function provides consistency such that a first name value used during a first time interval and re-used during a second time interval is mapped to two different internal identifiers during the different first and second time intervals.

8. The method of claim 1, further comprising:
    wherein the mapping function encodes output values using a classification field that indicates a size and range of the output value.

9. A system, comprising:
    one or more processors; and
    one or more storage elements having program instructions stored thereon that are capable of being executed by the one or more processors to cause operations comprising:
        accessing a multi-tenant dataset that includes a relational database table in which multiple tenants share one or more columns and a first tenant implements at least one added custom column;
        processing the multi-tenant dataset to migrate the relational database table to non-relational underlying storage and divide the database table, including:

generating first logical table information that specifies a first logical table for a first portion of the dataset corresponding to the first tenant including the at least one added custom column;

generating second logical table information that specifies a second logical table for a second portion of the dataset corresponding to a second tenant; and storing the first and second logical tables using non-relational key/value data structures in one or more storage elements, including:

storing entries from the first logical table for the first tenant across a first set of multiple key/value store buckets;

storing entries from the second logical table for the second tenant across a second set of multiple key/value store buckets; and generating internal identifiers for key/value storage for names associated with the first and second logical tables according to a mapping function, wherein:

a given internal identifier uses a smaller number of bits than its corresponding name, thereby reducing storage size relative to utilizing the names for key/value storage; and the mapping function preserves ordering among keys for a given bucket; and retrieving values from the first set of multiple key/value store buckets based on a query from the first tenant that specifies one or more keys.

10. The system of claim 9, wherein entries in respective key/value store buckets are sortable.

11. The system of claim 9, wherein the storing uses partition keys to spread entries from the first and second logical tables across multiple key/value store buckets.

12. A non-transitory computer-readable medium having computer instructions stored thereon that are capable of being executed by a computer system to cause operations comprising:

accessing a multi-tenant dataset that includes a relational database table in which multiple tenants share one or more columns and a first tenant implements at least one added custom column;

processing the multi-tenant dataset to migrate the relational database table to non-relational underlying storage and divide the database table, including:

generating first logical table information that specifies a first logical table for a first portion of the dataset corresponding to the first tenant including the at least one added custom column;

generating second logical table information that specifies a second logical table for a second portion of the dataset corresponding to a second tenant; and storing the first and second logical tables using non-relational key/value data structures in one or more storage elements, including:

storing entries from the first logical table for the first tenant across a first set of multiple key/value store buckets;

storing entries from the second logical table for the second tenant across a second set of multiple key/value store buckets; and generating internal identifiers for key/value storage for names associated with the first and second logical tables according to a mapping function, wherein:

a given internal identifier uses a smaller number of bits than its corresponding name, thereby reducing storage size relative to utilizing the names for key/value storage; and the mapping function preserves ordering among keys for a given bucket; and retrieving, by the computing system, values from the first set of multiple key/value store buckets based on a query from the first tenant that specifies one or more keys.

13. The non-transitory computer-readable medium of claim 12, wherein entries in respective key/value store buckets are sortable.

14. The non-transitory computer-readable medium of claim 12, wherein the first and second sets of multiple key/value store buckets at least partially overlap.

15. The non-transitory computer-readable medium of claim 12, wherein the storing uses partition keys to spread entries from the first and second logical tables across multiple key/value store buckets.

16. The non-transitory computer-readable medium of claim 15, wherein the partition keys include a logical table identifier and a bucket number.

17. The non-transitory computer-readable medium of claim 16, wherein the operations further comprise generating bucket numbers using a stable hash function.

18. The non-transitory computer-readable medium of claim 12, wherein the mapping function provides consistency such that a first name value used during a first time interval and re-used during a second time interval is mapped to two different internal identifiers during the different first and second time intervals.

* * * * *

UNITED STATES PATENT AND TRADEMARK OFFICE
CERTIFICATE OF CORRECTION

| | | |
|---|---|---|
| PATENT NO. | : 12,271,361 B2 | Page 1 of 1 |
| APPLICATION NO. | : 17/407993 | |
| DATED | : April 8, 2025 | |
| INVENTOR(S) | : Igor Fedorenko et al. | |

It is certified that error appears in the above-identified patent and that said Letters Patent is hereby corrected as shown below:

In the Claims

In Column 18 (Claim 8), Lines 52-53, please delete "The method of claim 1, further comprising: wherein" and insert -- The method of claim 1, wherein --.

Signed and Sealed this
Sixth Day of May, 2025

Coke Morgan Stewart
*Acting Director of the United States Patent and Trademark Office*